United States Patent
Kim

Patent Number: 5,892,552
Date of Patent: Apr. 6, 1999

[54] TIME CODE GENERATOR

[75] Inventor: Young-Chul Kim, Seoul, Rep. of Korea

[73] Assignee: Samsung Electronics Co., Ltd., Kyungki-Do, Rep. of Korea

[21] Appl. No.: 763,722

[22] Filed: Dec. 11, 1996

[30] Foreign Application Priority Data

Dec. 30, 1995 [KR] Rep. of Korea .................. 1995-68623

[51] Int. Cl.$^6$ ....................................................... H04N 7/08
[52] U.S. Cl. ........................... 348/478; 348/500; 348/571; 348/476
[58] Field of Search ..................................... 348/500, 510, 348/512, 545, 537, 505, 508, 478, 476, 460, 571, 15; 386/65; 360/14, 15, 18; 358/142, 310; 178/6 GA; H04N 7/08

[56] References Cited

U.S. PATENT DOCUMENTS

| | | | |
|---|---|---|---|
| 3,681,524 | 8/1972 | Nicholls | 178/6.6 A |
| 4,167,759 | 9/1979 | Tachi | 360/14 |
| 4,517,598 | 5/1985 | Van Valkenburg et al. | 358/142 |
| 4,532,557 | 7/1985 | Larkins | 360/33.1 |
| 5,063,456 | 11/1991 | Horiuchi et al. | 358/310 |
| 5,276,559 | 1/1994 | Sarkisian et al. | 360/18 |
| 5,327,296 | 7/1994 | Nagasawa | 360/15 |
| 5,455,630 | 10/1995 | McFarland et al. | 348/476 |
| 5,701,153 | 12/1997 | Reichek et al. | 348/15 |

Primary Examiner—Richard Lee
Assistant Examiner—Tung Vo
Attorney, Agent, or Firm—Sughrue, Mion, Zinn, Macpeak & Seas, PLLC

[57] ABSTRACT

A time code generator is provided and contains a detector, a serial-to-parallel (S/P) converter, a selector, a latch, a line window signal generator, a clock generator, and an interface. The detector detects serial time code information by comparing a composite video information having a digital conversion level with a selected reference level. The S/P converter converts the serial time code information into parallel time code information. The selector selectively outputs the composite video information or the parallel time code information as selected information. The latch latches the selected information as latched information in accordance with a predetermined transmission rate and outputs the latched information as an output signal. Also, the latch latches the selected information in response a time code clock signal. The line window signal generator generates a line window signal by comparing a line count value of the composite video information with preset time code start information and preset time code stop information. The clock generator generates the time code clock signal in response to the line window signal. The interfaces inputs external data and generates control signals which control the detector, the S/P converter, the selector, the latch, the line window signal generator, and the clock generator in accordance with the external data. Based on the above configuration, the time code information can be generated in response to externally supplied data, and thus, the generator is compatible with different types of time code information.

17 Claims, 8 Drawing Sheets

TIME CODE GENERATOR

RELATED APPLICATIONS

The present application is based on Korean Application No. 68623/1995 which is incorporated herein by reference for all purposes.

FIELD OF THE INVENTION

The present invention relates to a time code generator. More particularly, the present invention relates to a time code generator which detects or generates time code data that is inserted in the vertical blanking interval of a composite video signal of a television broadcasting system.

BACKGROUND OF THE INVENTION

A composite video signal transmitted within a television broadcasting system is a synthesized signal which comprises a luminance signal, a chrominance signal, a vertical sync signal, and a horizontal sync signal. Furthermore, the composite video signal has a vertical blanking interval which does not contain any data that is used to reproduce the video signal. As a result, time code data may be inserted into the vertical blanking interval, and such time code data may be extracted from such interval during an editing process in order to more easily edit the video signal.

The time code data may include a vertical interval time code VITC which relates to a particular standard created by the Society of Motion Picture and Television Engineers ("SMPTE"). For example, the time code VITC may correspond to the National Television System Committee ("NTSC") broadcasting system. In such system, a video signal contains 525 lines per picture and has a flash rate of 60 Hz, and the time code data is inserted in the vertical blanking intervals for lines 7–17 and lines 270–279. Alternatively, the time code VITC may correspond to the Phase Alteration Line ("PAL") broadcasting system. In such system, a video signal contains 625 lines per picture and has a flash rate of 50 Hz, and the time code data is inserted in the vertical blanking intervals for lines 6–22 and lines 319–335.

The vertical interval time code VITC may comprise nine 2-bit sync signals, nine 8-bit time codes, two bytes of time code information (frame/second/minute/hour), and one byte of error detection and correction code information. A more detailed example of the structure of the time code VITC is described in a book written by Keith Jack, entitled "Video Demystified", Hightext Publications, Inc., 1993, pp. 175–178. Such information is incorporated herein by reference.

When a video signal is edited, the time code information contained in the signal enables the editing process to be performed more efficiently. However, different broadcasting systems generate video signals which have line settings and characteristics which substantially differ depending upon the broadcasting systems. Accordingly, if a video time code generator is designed to generate a time code VITC in accordance with a particular broadcasting standard, the VITC information cannot be detected if the signal is transmitted in accordance with a different broadcasting standard. Accordingly, the signal cannot be efficiently edited, and thus, the compatibility between the time code generator and the various broadcasting systems is severely limited.

SUMMARY OF THE INVENTION

One object of the present invention is to provide a time code generator which is simple and can be easily corrected by adopting a digital method. Furthermore, an object of the present invention is to provide a generator which is compatible with many broadcasting systems.

In order to achieve the objects above, a time code generator is provided. Specifically, the time code generator comprises: detecting means for detecting serial time code information by comparing a composite video information having a digital conversion level with a selected reference level; serial-to-parallel conversion means for converting said serial time code is information into parallel time code information; selector means for selectively outputting said composite video information or said parallel time code information as selected information; latching means for latching said selected information as latched information in accordance with a predetermined transmission rate and outputting said latched information as an output signal, wherein said latching means latches said selected information in response to a time code clock signal; line window signal generating means for generating a line window signal by comparing a line count value of said composite video information with preset time code start information and preset time code stop information; clock generating means for generating said time code clock signal in response to said line window signal; and interfacing means for inputting external data and for generating at least one control signal for controlling at least one of said detecting means, said serial-to-parallel conversion means, said selector means, said latching means, said line window signal generating means, and said clock generating means in accordance with said external data.

BRIEF DESCRIPTION OF THE DRAWINGS

The above objects, other features, and advantages of the present invention will become more apparent by describing a preferred embodiment thereof with reference to the accompanying drawings in which.

DETAILED DESCRIPTION OF THE PREFERRED EMBODIMENTS

The following description of the preferred embodiments discloses specific circuit configurations, components, logical states, bit numbers, and frequencies. However, the preferred embodiments are merely examples of the present invention, and thus, the specific components and values described below are only used to more easily describe such embodiments and to provide an overall understanding of the present invention. Accordingly, one skilled in the art will readily recognize that the present invention is not limited to the specific components and values described below. Furthermore, the descriptions of various features and structures of the present invention which would be known to one skilled in the art are omitted for the sake of clarity and brevity.

Figure 1:
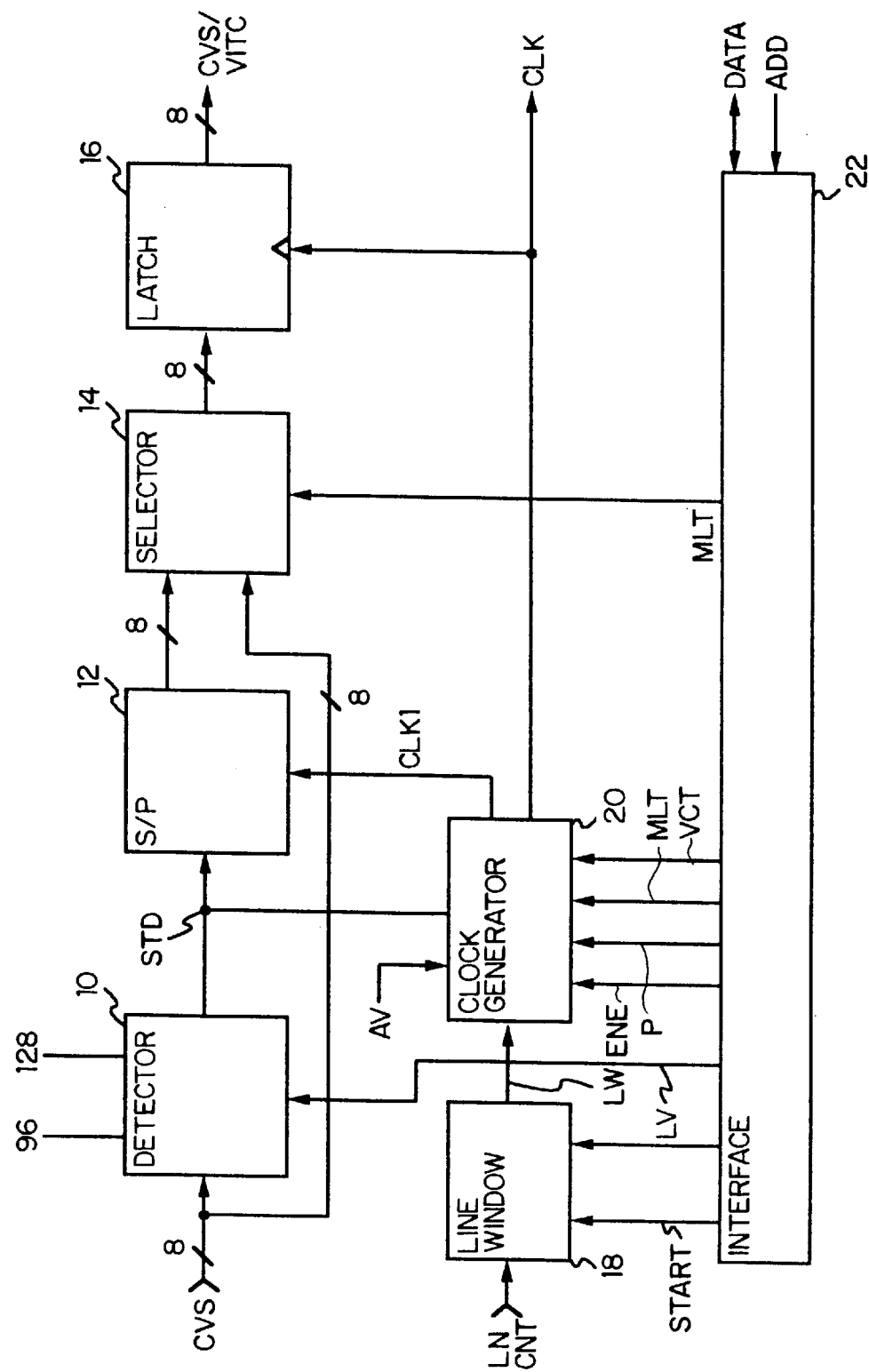
FIG. 1 is a block diagram of a time code generator in accordance with the present invention.

FIG. 1 shows a time code generator in accordance with one embodiment of the present invention. Specifically, the generator comprises a detector 10, a serial-to-parallel (S/P) converter 12, a selector 14, a latch 16, a line window signal generator 18, a clock generator 20, and an interface 22.

The detector 10 inputs a composite video signal CVS, a reference value setting signal LV, and various reference values (e.g. "96" and "128"). The composite video signal CVS is a signal having a particular conversion value, and the detector 10 detects time code information STD contained in the signal CVS by comparing the value of the signal CVS with a particular reference level. For example, if the reference value setting signal LV has a first value (e.g. "1"), the detector 10 may compare the value of composite video signal CVS with the reference value "96". On the other hand, if the setting signal LV has a second value (e.g. "0"), the detector 10 may compare the value of the signal CVS with the reference value "128". Then, the detector 10 outputs the serial time code information STD based on such comparison.

The S/P converter 12 inputs the serial time code information STD and converts such information STD into parallel time code information. The S/P converter 12 also inputs a first clock signal CLK1 generated by the clock generator 20 and converts the serial time code information STD into the parallel time code information based on such clock signal CLK1.

The selector 14 directly inputs the composite video signal CVS and inputs the parallel time code information from the S/P converter 12. Then, the selector 14 selectively outputs the parallel time code information or the signal CVS as a selected signal based on an output selection signal MLT output by the interface 22.

The latch 16 inputs the selected signal and latches such signal in accordance with a predetermined transmission rate. Specifically, the latch 16 latches the selected signal in response to a time code clock signal CLK generated by the clock generator 20 and outputs the latched information as an output signal CVS/VITC.

The line window signal generator 18 inputs a line count value LNCNT and compares such value LNCNT with time code start information START and with time code stop information STOP output from the interface 22. Then, based on such comparisons, the signal generator 18 outputs a line window signal LW.

The clock generator 20 inputs the line window signal LW and generates the time code clock signal CLK based on such signal LW. Furthermore, the generator 20 inputs an enable signal ENE, a determining signal P, the output selection signal MLT, and a frequency division ratio selection signal VCT from the interface 22 and generates the clock signal CLK further based on such signals ENE, P, MLT, and VCT. Also, the generator 20 inputs an active video signal AV.

The interface 22 inputs external data from a data bus DATA and an external address from an address bus ADD and generates the various signals START, STOP, LV, ENE, P, MLT, and VCT for controlling the various devices illustrated in FIG. 1.

The various signals illustrated in FIG. 1 will be described in more detail below. The composite video signal CVS contains 8-bit composite video information which indicates the analog-to-digital conversion level of the signal CVS. Furthermore, the composite video information may have a blanking level of 64 or 80 and may have a top level of 144 or 224. The line count value LNCNT represents a 1/2 line count value of the horizontal line is number of the composite video signal CVS.

The time code start information START is 10-bit data which indicates the horizontal line number at which the vertical interval time code VITC is to be or has been generated. On the other hand, the time code stop information STOP is 10-bit data which indicates the horizontal line number at which the generation of the time code VITC is to cease.

The reference value setting signal LV selects a reference value (e.g. "96" or "28") which is used to extract the serial time code data STD from the composite video signal CVS. As described above, if the signal LV has a value "1", the detector 10 may compare the value of composite video signal CVS with the reference value "96". On the other hand, if the signal LV has a value "0", the detector 10 may compare the value of the signal CVs with the reference value "128". Then, the detector 10 outputs the serial time code information STD based on such comparison.

The output selection signal MLT controls the output of the selector 14. For instance, if the signal MLT has a first value (e.g. "1"), the selector 14 may output the composite video signal CVS as the selected signal. On the other hand, if the signal MLT has a second value (e.g. "0"), the selector 14 may output the parallel time code information.

The determining signal P is used by the clock generator 20 generate the time code clock signal CLK. The time code clock signal CLK is a clock signal for sampling the data contained in the vertical interval timing code VITC. For example, the clock signal may be selectively set to equal the data transmission rate of the video information, 1/8 of the data transmission rate, or 1/10 of the data transmission rate. As a result, the output signal CVS/VITC is transmitted in accordance with the time code clock signal CLK. The frequency division ratio selection signal VCT determines the frequency signal by which to divide an internal clock signal of the generator 20 in order to produce the clock signal CLK. For example, if the ratio selection signal VCT equals a first value (e.g. "1") a frequency division ratio of 1/10 may be selected. Thus, the generator 20 may set the time code clock signal CLK to equal 1/10 the transmission rate. Alternatively, if the signal VCT equals a second value (e.g. "0") a frequency division ratio of 1/8 may be selected. Thus, the generator 20 may set the clock signal CLK to equal 1/8 the transmission rate.

Figure 2:
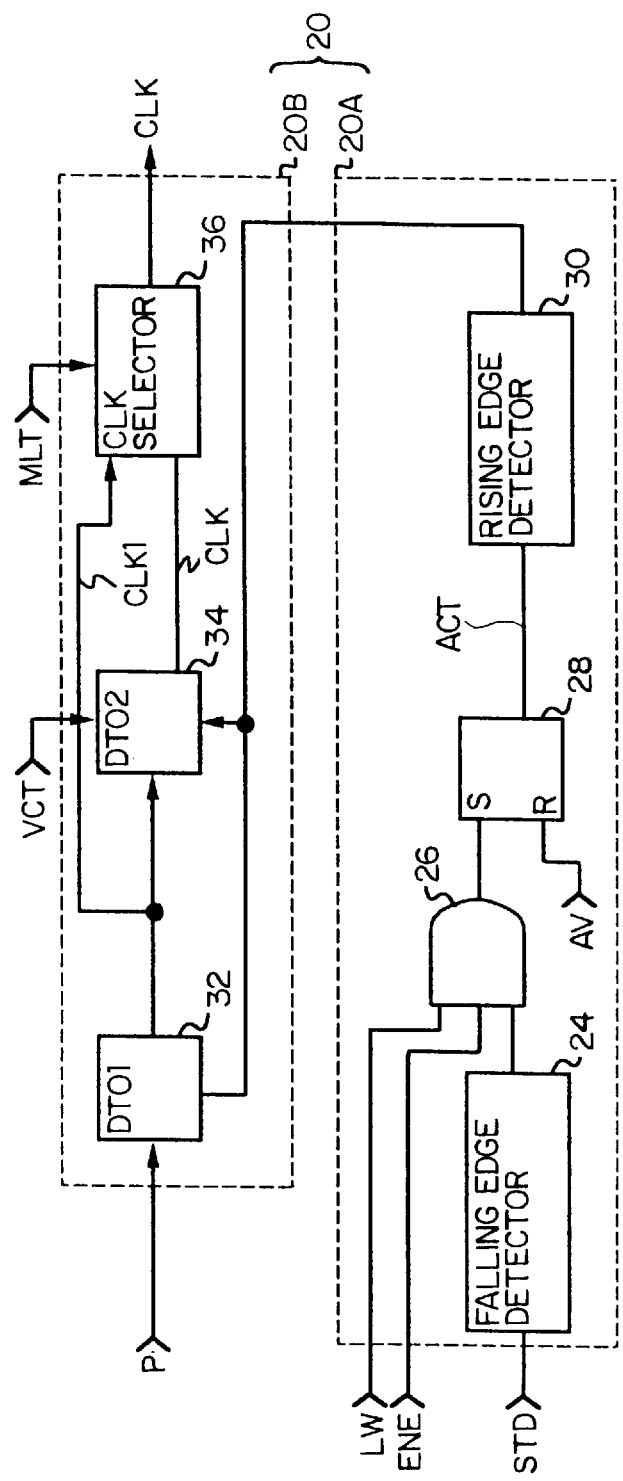
FIG. 2 is a block diagram of the clock generator shown in FIG. 1.

An illustrative example of a more detailed configuration of the clock generator 20 is shown in FIG. 2. In particular, the clock generator 20 comprises a reset means 20A and a clock means 20B.

The reset means 20A includes a falling edge detector 24, a gate circuit 26, an active signal generator 28, and a rising edge detector 30. The edge detector 24 inputs the serial time code information STD, detects the falling edge of a time code sync bit signal contained in the information STD, and outputs a corresponding falling edge detection signal.

The gate circuit 26 inputs the line window signal LW, the enabling signal ENE, and the falling edge detection signal and outputs a corresponding generator setting signal. The signal generator 28 inputs the generator setting signal and outputs a corresponding active signal ACT. Furthermore, the generator 28 inputs the active video signal AV and is reset by a horizontal sync signal contained in video signal AV. The rising edge detector 30 inputs the active signal ACT, detects the rising edge of such signal, and outputs a corresponding reset signal.

The clock means 20B comprises a first discrete time oscillator 32, a second discrete time oscillator 34, and a clock selector 36. The first discrete time oscillator 32 inputs the reset signal output from the edge detector 30 and inputs the determining signal P output from the interface 22. Also, the oscillator 32 is reset in response to the reset signal and generates a first clock signal CLK1 based on the determining signal P. Furthermore, the clock signal CLK1 corresponds to a 13-bit data transmission rate which is determined in accordance with the clock number per line designated by the signal P.

The second discrete time oscillator 34 receives the first clock signal CLK1 and the frequency division ratio selection signal VCT. Then, the oscillator 34 frequency divides the first clock signal CLK1 based on a division ratio (e.g. 1/8 or 1/10), which corresponds to the value of the ratio selection signal VCT, and outputs the result as a second clock signal CLK2. In addition, the oscillator 34 is reset in accordance with the reset signal output by the edge detector 30.

The clock selector 36 inputs the first clock signal CLK1, the second clock signal CLK2, and the output selection signal MLT. Then, the selector 36 selectively outputs the clock signal CLK1 or CLK2 as the time code clock signal CLK based on the selection signal MLT.

Figure 3A:
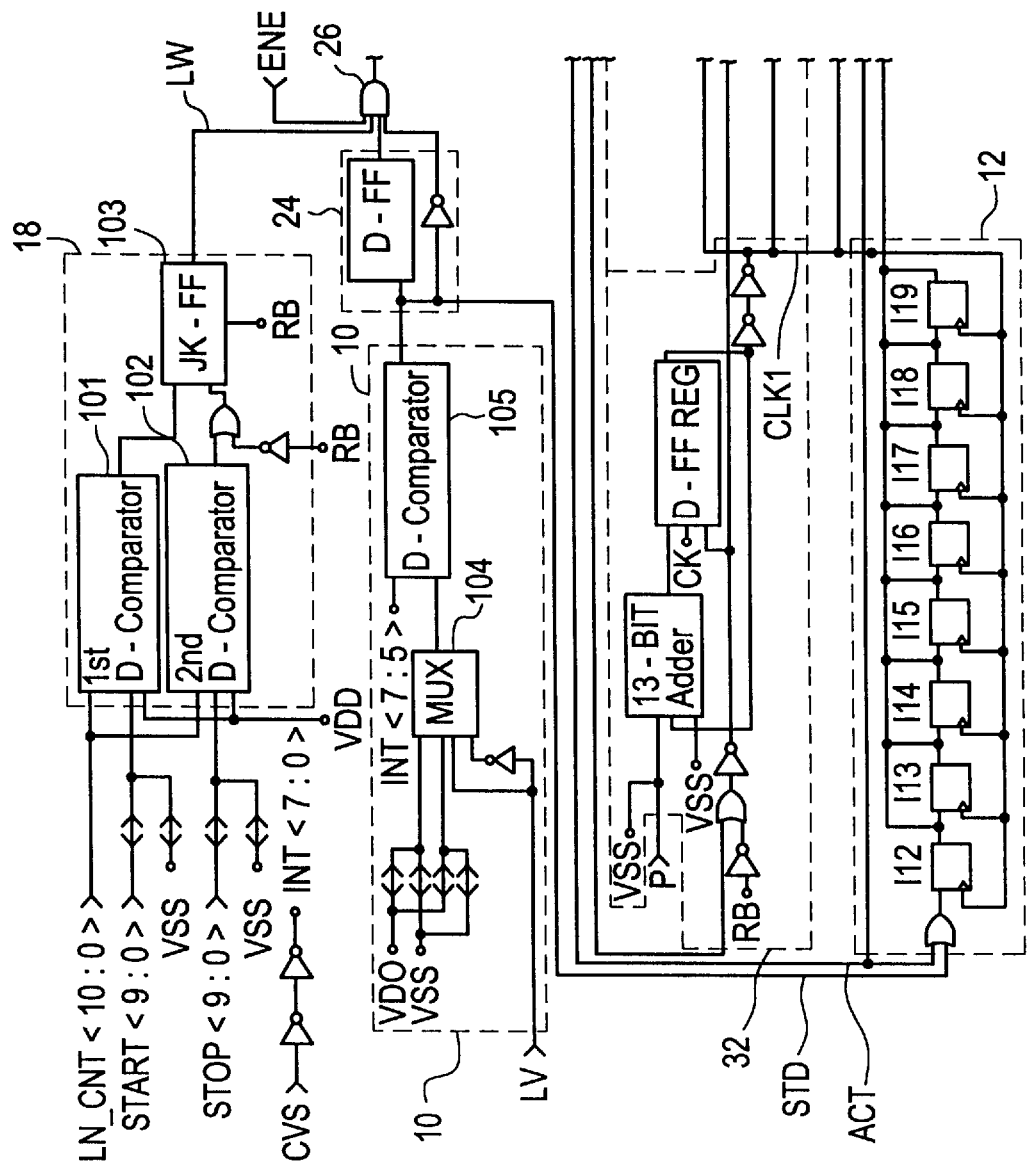
FIG. 3 is a detailed circuit diagram of a preferred embodiment of the components shown in FIGS. 1 and 2.
Figure 3B:
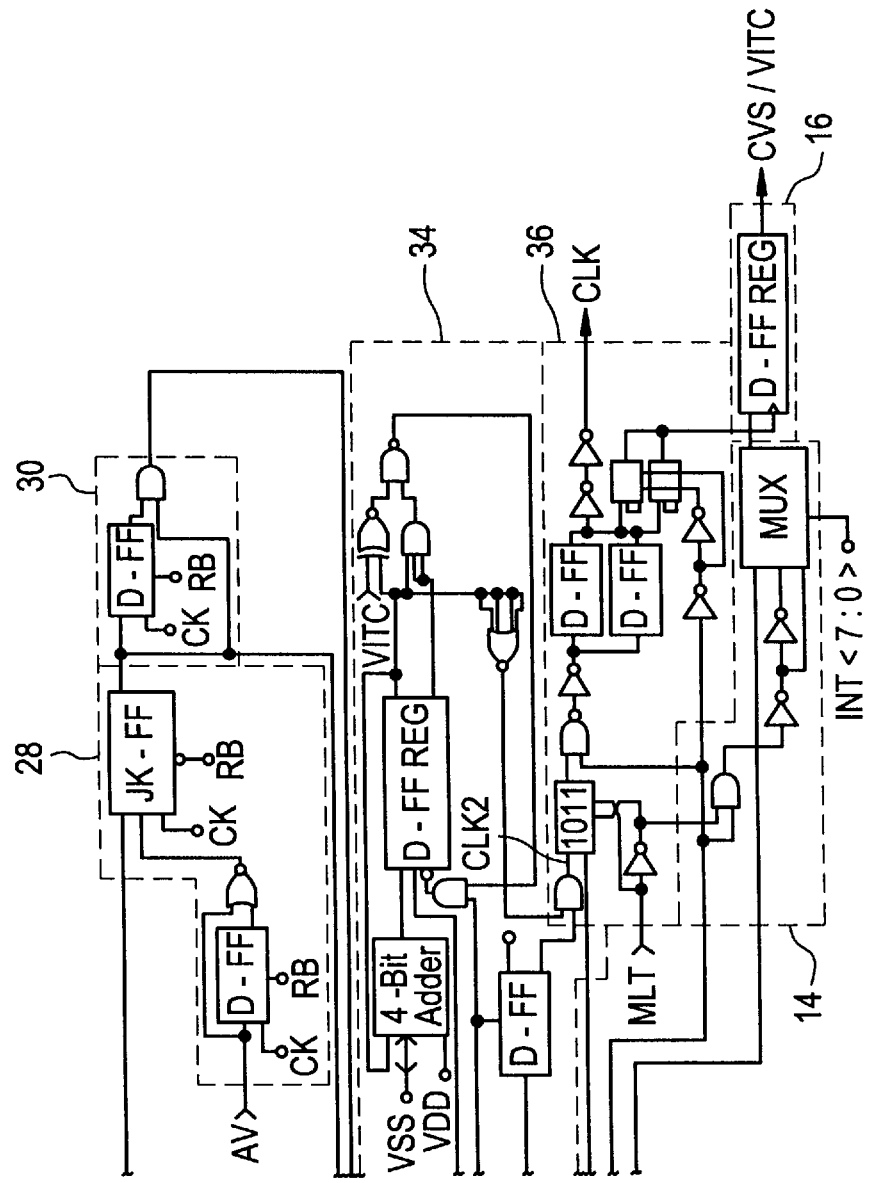
Figure 4A:
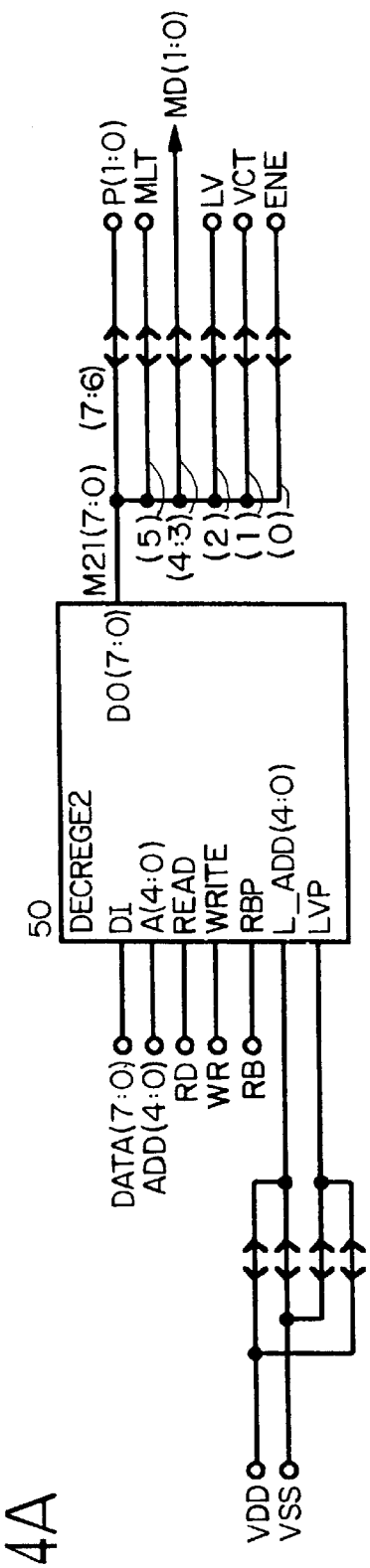
FIG. 4 is a block diagram of the interface shown in FIG. 1.
Figure 4B:
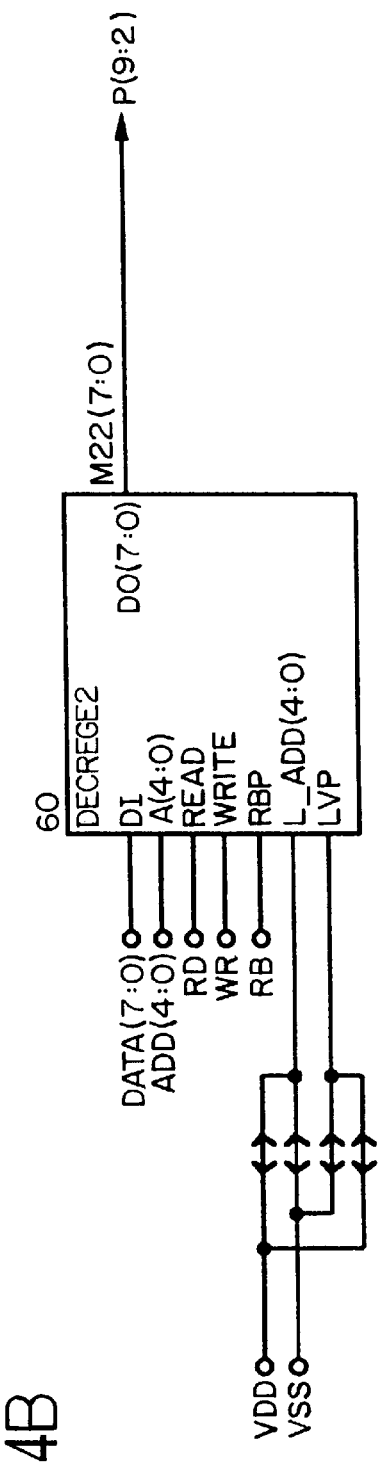
Figure 4C:
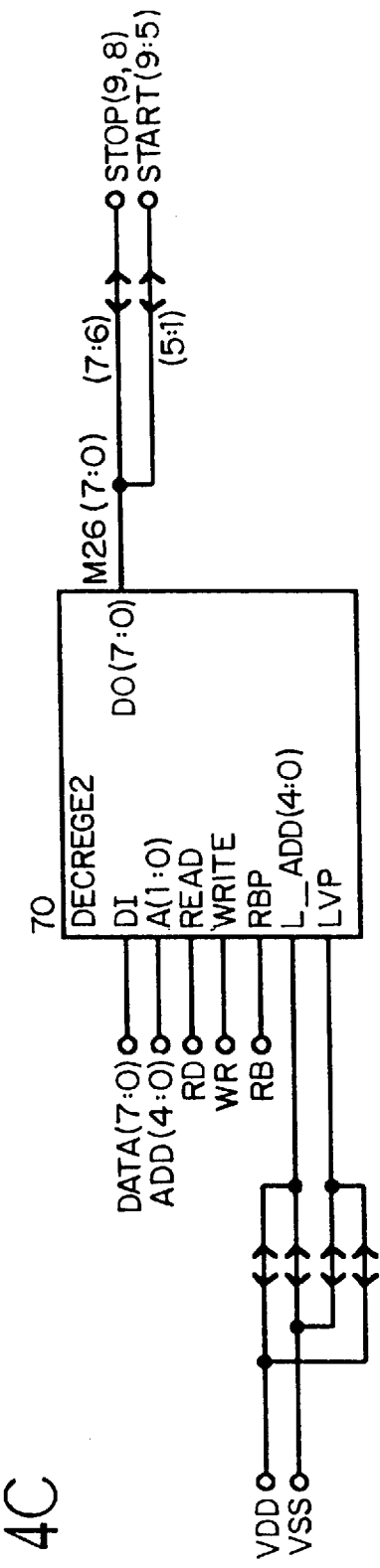
Figure 4D:
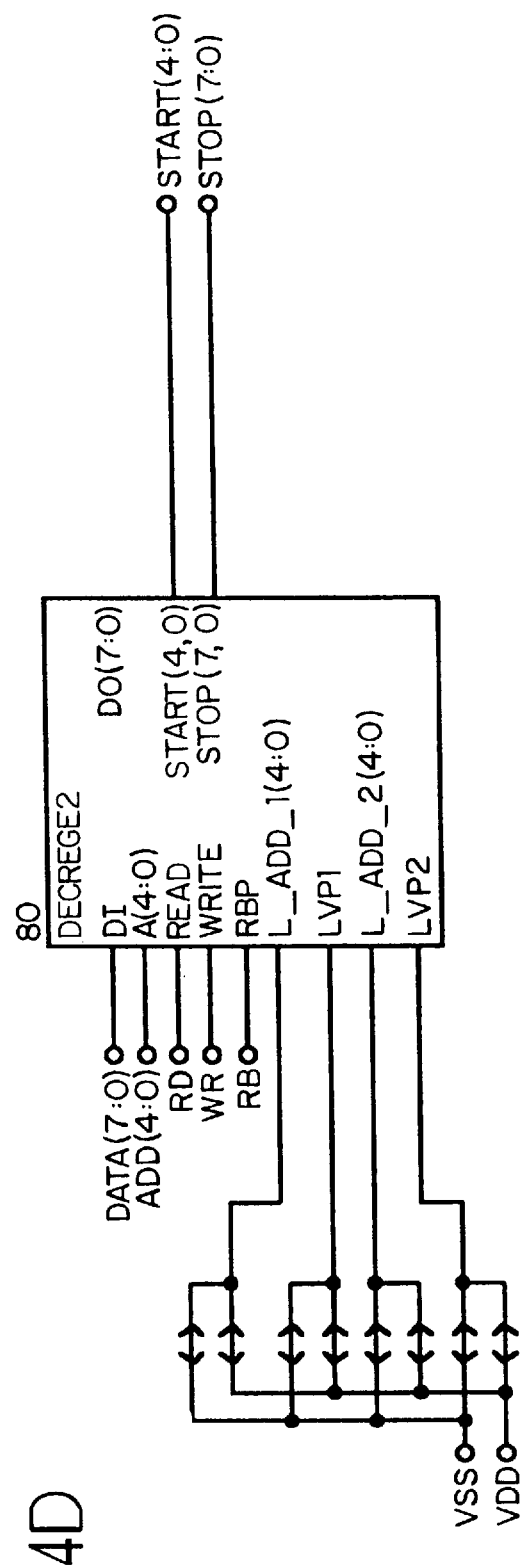

A preferred embodiment of the components illustrated in FIGS. 1 and 2 is shown in FIG. 3. Specifically, the figure shows an example of the detailed circuitry of the detector 10, the S/P converter 12, the selector 14, the latch 16, the line window signal generator 18, the falling edge detector 24, the gate circuit 26, the active signal generator 28, the rising edge detector 30, the first discrete time oscillator 32, the second discrete time oscillator 34, and the clock selector 36.

The detector comprises an inverter 10.1, a multiplexer 10.2, and a comparator 10.3. The inverter 10.1 inputs the reference value setting signal LV and produces a inverted signal LV\. The multiplexer 10.2 inputs the reference values "96" and "128" via data input ports and inputs the reference value setting signal LV and the inverted signal LV\ via selection ports. Then, the multiplexer 10.2 selectively outputs either the reference value "96" or the reference value "128" as a selected reference value based on the values of the signals LV and LV\.

The comparator 10.3 inputs the three most significant bits of the composite video signal CVS and the selected reference value and compares the signal CVS with the reference value. If the three bits of the signal CVS are greater than the selected reference value, the comparator 10.3 outputs a first value (e.g. "1") as the serial time code information STD. On the other hand, if the three bits are less than the reference value, the comparator 10.3 outputs a second value (e.g. "0") as the information STD. Afterwards, the serial time code information STD is output to the falling edge detector 24.

The falling edge detector 24 comprises an inverter 24.1 and a flip-flop 24.2. The inverter 24.1 inputs the information STD and outputs an inverted signal STD\. The flip-flop 24.2 inputs the time code information STD, detects the falling edges of such information STD, and outputs the corresponding falling edge detection signal.

The line window signal generator 18 comprises a first comparator 18.1, a second comparator 18.2, an inverter 18.3, a gate circuit 18.4, and a flip-flop 18.5. The first comparator 18.1 inputs the line count value LNCNT and the time code start information START, compares the values of the signals LNCNT and START, and outputs a flip-flop setting signal based on such comparison. For example, if the line count value LNCNT is greater than the time code start information START, the comparator 18.1 may output a "1" as the flip-flop setting signal. On the other hand, if the value LNCNT is less than the information START, the comparator 18.1 may output a "0" as the flip-flop setting signal.

The second comparator 18.2 inputs the line count value LNCNT and the time code stop information STOP, compares the values of the signals LNCNT and STOP, and outputs a first resetting signal based on such comparison. For instance, if the line count value LNCNT is greater than the time code stop information STOP, the comparator 18.2 may output a "1" as the first resetting signal. On the other hand, if the value LNCNT is less than the information STOP, the comparator 18.2 may output a "0" as the first resetting signal.

The inverter 18.3 inputs a reset bar signal RB and inverts such signal RB to generate a second resetting signal. Then, the gate circuit 18.4 inputs the first and second resetting signals, performs an OR operation on such signals, and outputs a flip-flop resetting signal.

The flip-flop 18.5 inputs the flip-flop setting signal via its set input port, inputs the flip-flop resetting signal via its reset input port, and outputs the line window signal LW based on the values of the setting and resetting signal. For example, the line window signal LW normally equals "0". However, if the setting signal output by the comparator equals "1", the flip-flop 18.5 outputs the line window signal LW having a value of "1". In other words, when the horizontal line number of the composite video signal CVS (i.e. the line count value LNCNT) is greater than the initial horizontal line number at which time code information is to be located in the signal CVS (i.e. the time code start information START), the flip-flop 18.5 outputs a line window signal LW which equals "11".

Subsequently, the signal LW equals "1" until the first resetting signal output by the second comparator 18.2 equals "1". In particular, after the flip-flop 18.5 is set by the flip-flop setting signal and the signal LW equals "1", the horizontal line number (i.e. the line count value LNCNT) of the video signal CVS continues to increase with time. Consequently, the value LNCNT eventually becomes greater than the time code stop information STOP, the comparator 18.2 outputs the first resetting signal having a value "1" to the gate circuit 18.4, and the gate circuit 18.4 outputs the flip-flop resetting signal to the flip-flop 18.5. As a result, the flip-flop 18.5 is reset and outputs a line window signal LW which equals "1". Accordingly, the line window signal generator 18 only outputs a line window signal LW having a particular value (e.g. "1") when the horizontal line number of the video signal CVS is between the value set by the time code start information START and the time code stop information STOP.

The gate circuit 26 inputs the line window signal LW from the generator 18 and the enable signal ENE from the interface 22. Also, the gate circuit 26 inputs the falling edge detection signal and the inverted signal STD\ from the falling edge detector 24. Then, the circuit 26 performs an AND operation on such signals and outputs the generator setting signal.

Based on the configuration above, the generator setting signal is output only when the horizontal line number of the composite video signal CVS is between the start information START and the stop information STOP (i.e. when the signal LW is high) and after the detector 24 has detected an edge in the serial time code information STD (i.e. when the falling edge detection signal is high). Thus, when the signal LW is high, the generator setting signal is a pulsed signal which inversely corresponds to the pulses of the serial time code information STD.

The generator setting signal is output to the active signal generator 28 which comprises a flip-flop 28.1, a flip-flop 28.2, and a gate circuit 28.3. The flip-flop 28.2 inputs the active video signal AV via its set input and outputs a corresponding output signal. The gate circuit 28.3 also inputs the video signal AV as well as the signal output from the flip-flop 28.2, performs a NOR operation on the two signals, and outputs a pulsed resetting signal which corresponds to the falling edge of the active video signal AV.

The flip-flop 28.1 inputs the generator setting signal via its set input and inputs the pulsed resetting signal via its reset input. Accordingly, when the generator setting signal is input, the flip-flop 28.1 outputs the active signal ACT having a value which equals "1". Subsequently, when the falling edge of the active video signal AV occurs, the flip-flop 28.1 is reset and the signal ACT equals "0". Furthermore, the flip-flops 28.1 and 28.2 are reset by the reset bar signal RB.

The rising edge detector 30 comprises a flip-flop 30.1 and a gate circuit 30.2. The flip-flop 30.1 inputs the active signal ACT and delays the input of the active signal ACT to produce a delayed active signal. The gate circuit 30.2 inputs the delayed active signal and the active signal ACT, performs an AND operation on such signals, and outputs the result as the reset signal. Accordingly, the rising edge detector 30 outputs the reset signal shortly after the rising edge of the signal ACT.

The first discrete time oscillator 32 comprises a 13-bit adder 32.1, a flip-flop register 32.2, inverters 32.3 and 32.5–32.7, and a gate circuit 32.4. The reset signal output from the rising edge detector 30 is input to the reset input of the flip-flop register 32.2 via the gate circuit 32.4 and the inverter 32.5, and thus, the register 32.2 is reset in accordance with such signal. Furthermore, the flip-flop register 32.2 is also reset by the reset bar signal RB which is input to the register 32.2 via the inverter 32.3, the gate circuit 32.4, and the inverter 32.5.

The determining signal P has a predetermined value (e.g. "543") and is input to one input port of the 13-bit adder 32.1. Also, a 13-bit first oscillator signal output from the flip-flop register 32.2 is input to a second input port of the adder 32.1. Then, the adder 32.1 adds the two signals to produce an added signal, the added signal is input by the flip-flop register 32.2, and the register 32.2 outputs the added signal as the 13-bit first oscillator signal in accordance with a system clock CK. Afterwards, the most significant bit of the first oscillator signal is output as the first clock signal CLK1 via the inverters 32.6 and 32.7.

The adder 32.1 may actually be used as a 12-bit adder, and the thirteenth bit of the adder 32.1 may be used to compensate for an overflow condition. In any event, since the adder 32.1 contains thirteen bits, the maximum value which may be output by the adder 32.1 is "8191" (i.e. $2^{13}-1$) before returning to the original value of "0". Moreover, since the determining signal P (e.g. "543") is input to the adder 32.1, the period of first clock signal CLK1 equals (8191/543)*(the period of the system clock CK), and such period is the data transmission rate of the time code generator.

The second discrete time oscillator 34 comprises a 4-bit adder 34.1, a flip-flop register 34.2, a flip-flop 34.3, and gate circuits 34.4 to 34.9. A logic "1" is input to one input port of the 4-bit adder 34.1, and a second oscillator signal output from the flip-flop register 34.2 is input to a second input port of the adder 34.1. Then, the adder 34.1 adds the two signals to produce an added signal, and the added signal is input by the flip-flop register 34.2. Then, the register 34.2 outputs the second oscillator signal and a third oscillator signal in accordance with the first clock signal CLK1.

The gate circuit 34.6 inputs the frequency division ratio selection signal VCT and a certain bit (or bits) of the second oscillator signal and performs an EX-NOR operation on such signals to produce a first gated signal. The gate circuit 34.7 inputs a particular bit (or bits) of the second oscillator signal and a particular bit (or bits) of the third oscillator signal, performs an AND operation on such signals, and outputs a second gated signal. The gate circuit 34.8 inputs the first gated signal and the second gated signal, performs a NAND operation on such signals, and outputs a third gated signal. The third gated signal is input by the reset port of the flip-flop register 34.2 via the gate circuit 34.4 in order to reset the register 34.2. (Also, the register 34.2 is reset by the reset bar signal RB which is input to the reset port via the inverter 32.3, the gate circuit 32.4, the inverter 32.5, and the gate circuit 34.4.

The flip-flop 34.3 inputs the first clock signal CLK1, delays such signal by a predetermined period, and outputs a delayed first clock signal. In addition, the flip-flop 34.3 is reset by the reset bar signal RB which is input via the inverter 32.3, the gate circuit 32.4, and the inverter 32.5.

The gate circuit 34.5 inputs particular bits of the second oscillator signal output from the flip-flop register 34.2, performs a NOR operation on such signals, and outputs a fourth gated signal. The gate circuit 34.9 inputs the fourth gated signal and the delayed first clock signal, performs an AND operation on such signals, and outputs the second clock signal CLK2.

As illustrated above, the frequency division ratio selection signal VCT is input to the reset port of the flip-flop register 34.2 via the gate circuits 34.6, 34.8, and 34.4. Accordingly, the second oscillator signal output from the register 34.2 depends upon the value of the ratio selection signal VCT. Thus, since the second clock signal CLK2 output by the second discrete time oscillator 34 depends upon the second oscillator signal, the period of the clock signal CLK2 can be adjusted by changing the value of the selection signal VCT. For example, the value of the signal VCT may be selected such that the oscillator 34 frequency divides the first clock signal CLK1 based on a division ratio of 1/8 and outputs the result as the second clock signal CLK2.

Alternatively, the value of the signal VCT may be selected such that the oscillator 34 frequency divides the first clock signal CLK1 based on a division ratio of 1/10 and outputs the result as the second clock signal CLK2.

The S/P converter 12 comprises a gate circuit 12.1 and flip-flops 12.2 to 12.9. The serial time code information STD is input to the input port of the flip-flop 12.2 via the gate circuit 12.1. The output of the flip-flop 12.2 is input by the flip-flop 12.3, the output of the flip-flop 12.3 is input by the flip-flop 12.4, the output of the flip-flop 12.4 is input by the flip-flop 12.5, etc. In addition, the outputs of all of the flip-flops 12.2 to 12.9 are output in parallel, and the first clock signal CLK1 is input to the clock inputs of all of the flip-flops 12.2 to 12.9. As a result, the S/P converter 12 inputs the serial time code information STD and outputs corresponding parallel time code information in accordance with the first clock signal CLK1. In addition, the active signal ACT output from the active signal generator 28 is input to the input port of the flip-flop 12.2 via the gate circuit 12.1.

The clock selector 36 comprises a multiplexer 36.1, inverters 36.2, 36.4, 36.7, 36.8, 36.9, and 36.10, a gate circuit 36.3, a flip-flop 36.5, and a multiplexer 36.11. The multiplexer 36.1 inputs the first clock signal CLK1 and the second clock signal CLK2 via its input ports. The inverter 36.2 inputs the output selection signal MLT from the interface 22 and outputs a corresponding inverted output selection signal MLT\. Moreover, the signals MLT and MLT\ are supplied to the selection ports of the multiplexer 36.1. Accordingly, the multiplexer 36.1 outputs either the first clock signal CLK1 or the second clock signal CLK2 as a selected clock signal in accordance with the value of the output selection signal MLT. For example, if the signal MLT has a first value (e.g. "0"), the multiplexer 36.1 outputs the first clock signal CLK1 as the selected clock signal. On the other hand, if the signal MLT has a second value (e.g. "1"), the multiplexer 36.1 outputs the second clock signal CLK2 as the selected clock signal.

Subsequently, the selected clock signal is output as the time code clock signal CLK via the gate circuit 36.3, the inverter 36.4, the flip-flop 36.5, and the inverters 36.7 and 36.8. In addition, the gate circuit 36.3 also inputs the active signal ACT from the active signal generator 28 and performs a NAND operation on the active signal ACT and the selected clock signal output by the multiplexer 36.1. Thus, the selected clock is signal is masked by the gate circuit 36.3 and is only output as the time code clock signal when the active signal ACT equals a certain value (e.g. "1").

The selected clock signal is also output to the multiplexer 36.11 via the gate circuit 36.3, the inverter 36.4, and the flip-flop 36.5. The multiplexer 36.11 inputs the selected clock signal via a first input port and the system clock CK via a second input port. Furthermore, the multiplexer 36.11 has selection ports which input the active signal ACT and an inverted signal ACT\ via the inverters 36.9 and 36.10. Thus, the multiplexer 36.11 outputs the selected clock signal or the system clock CK as a latch clock signal based on the value of the signal ACT. Also, the circuitry may be designed such that the latch clock signal corresponds to or equals the time code clock signal CLK.

The selector 14 comprises a gate circuit 14.1, inverters 14.2 and 14.3, and a multiplexer 14.4. The gate circuit 14.1 inputs the inverted output selection signal MLT\ and the active signal ACT, performs an AND operation on such signals, and outputs a masked selection signal. Then, the masked selection signal and an inverted masked selection signal are output to the selection inputs of the multiplexer 14.4 via the inverters 14.2 and 14.3. In addition, one data input of the multiplexer 14.4 inputs the parallel time code data from the S/P converter 12, and another data input of the multiplexer 14.4 inputs the composite video signal CVS. Accordingly, the multiplexer 14.4 selectively outputs the parallel time code data or the video signal CVS as the selected signal based on the value of the output selection is signal MLT. For instance, if the signal MLT has a first value (e.g. "0"), the multiplexer 14.1 outputs the parallel time code information as the selected signal. On the other hand, if the signal MLT has a second value (e.g. "1"), the multiplexer 14.4 outputs the composite video signal CVS as the selected signal.

The latch 16 comprises a flip-flop register 16.1 which may contain eight flip-flops connected in parallel. The register 16.1 inputs the selected signal from the selector 14 and inputs the latch clock signal from the clock selector 36. Then, the register 16.1 outputs the selected signal in accordance with the latch clock signal as the output signal CVS/VITC.

As illustrated above, the composite video signal CVS is input to the detector 10, and the serial time code information STD is extracted from the signal CVS based on the value of the reference value setting signal LV. Then, the time code information STD is converted into the parallel time code information by the S/P converter 12. Afterwards, the selector 14 outputs either the parallel time code information or the original video signal CVS based on the value of the output selection signal MLT.

Furthermore, the value of the setting signal LV enables the serial time code information STD to be extracted from the signal CVS based on a plurality of reference values "96" and "128". In other words, since different types of video signals CVS may contain time code information STD having different amplitudes, the detector 11 can detect such information STD in the different signals CVS. Accordingly, the compatibility of the time code generator with various broadcasting systems is substantially increased in comparison to conventional generators.

An illustrative embodiment of the detailed configuration of the interface 22 is shown in FIG. 4. Specifically, the interface 22 comprises control circuits 50, 60, 70, and 80 for controlling the various components of the time code generator. Moreover, the control circuits 50, 60, 70, and 80 are connected to a microcomputer (not shown), are commonly connected to the data bus DATA for inputting various data, and are commonly connected to the address bus ADD for inputting various addresses. The data and address buses DATA and ADD are used to read data from and write data to each of the circuits 50, 60, 70, and 80 in accordance with a user's intention.

Since the circuits 50, 60, and 70 generally have the same configuration, the following discussion will limited to a representative description of the control circuit 50 for the sake of brevity. The circuit 50 comprises a data port DI, an address port A, a read port READ, a write port WRITE, a reference address port L_ADD, a reference value port LVP, and a reset bar signal port RBP.

The data port DI is connected to the data bus DATA and inputs and outputs various data (e.g. count values), and the address port A is connected to the address bus ADD for inputting various addresses. When the count value contained in the control circuit 50 is to be read, the microcomputer (not shown) outputs the address of the circuit 50 on the address bus ADD and outputs a read enable signal RD. As a result, the address port A and the read port READ respectively input the address and signal RD, and the circuit 50 outputs the count value on the data bus DATA via the data port DI. On the other hand, when a new count value is to be written to the circuit 50, the microcomputer (not shown) outputs the address of the circuit 50 on the address bus ADD, outputs the new count value on the data bus DATA, and outputs a write enable signal WR. As a result, the address port A and the write port WRITE respectively input the address and signal WR, and the circuit 50 inputs the new count value on the data bus DATA via the data port DI.

The reference address port L_ADD inputs a preset address signal which indicates the address of the control circuit 50. The preset address signal may be hardwired to a predetermined address, and when an address is output on the address bus ADD, the circuit 50 compares such address with the preset address signal to determine if the address corresponds to the address of the control circuit 50.

The reference value port LVP inputs a preset count value which is used by the circuit as the initial count value until a new count value is input via the data port DI. Furthermore, the preset count value may also be a hardwired signal.

The reset bar port RBP inputs the reset bar signal RB, and the signal RB initializes the control circuit 50. For example, if the user has previously written a new count value to the data port DI and the reset bar signal RB is input, the new count value is replaced with the preset count value input via the reference value port LVP.

In the control circuit 50, the preset count value input to the port LVP equals "216" ("11011000"), and the preset address signal input to the port L_ADD equals "21" ("10101"). If no new count values are input to the circuit 50 by the user, the preset count value "216" is output to the output port DO as an output signal M21. Furthermore, the two most significant bits of the signal M21 ("11") are output as the two least significant bits (e.g. bits 1 and 0) of the determining signal P, the third most significant bit ("10") is output as the output selection signal MLT, the fourth and fifth most significant bits ("11") are output as a signal MD, the sixth most significant bit ("0") is output as the reference value setting signal LV, the seventh most significant bit ("0") is output as the frequency division ratio selection signal VCT, and the eight most significant bit ("0") is output as the enable signal ENE.

In the control circuit 60, the preset count value input to the port LVP equals "135" ("10000111"), and the preset address signal input to the port L_ADD equals "22" ("10110"). Also, if no new count values are input to the circuit 60 by the user, the preset count value "135" is output to the output port DO as an output signal M22. Thus, the signal M22 ("10000111") is output as the eight most significant bits (e.g. bits 9 to 2) of the determining signal P.

In the control circuit 70, the preset count value input to the port LVP equals "0" ("00000000"), and the preset address signal input to the port L_ADD equals "26" ("11010"). Also, if no new count values are input to the circuit 70 by the user, the preset count value "0" is output to the output port DO as an output signal M26. As a result, two most significant bits ("00") of the signal M26 are output as the two most significant bits (e.g. 9 and 8) of the time code stop information STOP, and the is third through eighth most significant bits ("000000") of the signal M26 are output as the five most significant bits (e.g. bits 9 to 5) of the time code start information START.

The control circuit 80 may have a special function such that it operates as if two basic control circuits (e.g. control circuits 50 and 60) are combined and connected to the microcomputer (not shown). Furthermore, control circuit 80 comprises a data port DI, an address port A, a read port READ, a write port WRITE, and a reset bar port RBP which operate similarly to the corresponding ports of the circuits 50, 60, and 70. In addition, the circuit comprises first and second reference address ports L_ADD_1 and L_ADD_2 and first and second reference value ports LVP1 and LVP2.

In the control circuit 80, the preset count value input to the port LVP1 equals "11" ("00001011"), and the preset address signal input to the port L_ADD_1 equals "20" ("10100"). If no new count values are input to the circuit 80 by the user, the five least significant bits of the preset count value ("01011") are output as the five least significant bits (e.g. bits 4 to 0) of the time code start information START. On the other hand, the preset count value input to the port LVP2 equals "12" ("00001100"), and the preset address signal input to the port L_ADD_2 equals "21" ("10101"). If no new count values are input to the circuit 80 by the user, the preset count value ("00001100") is output as the eight least significant bits (e.g. bits 7 to 0) of the time code stop information STOP.

Figure 5:
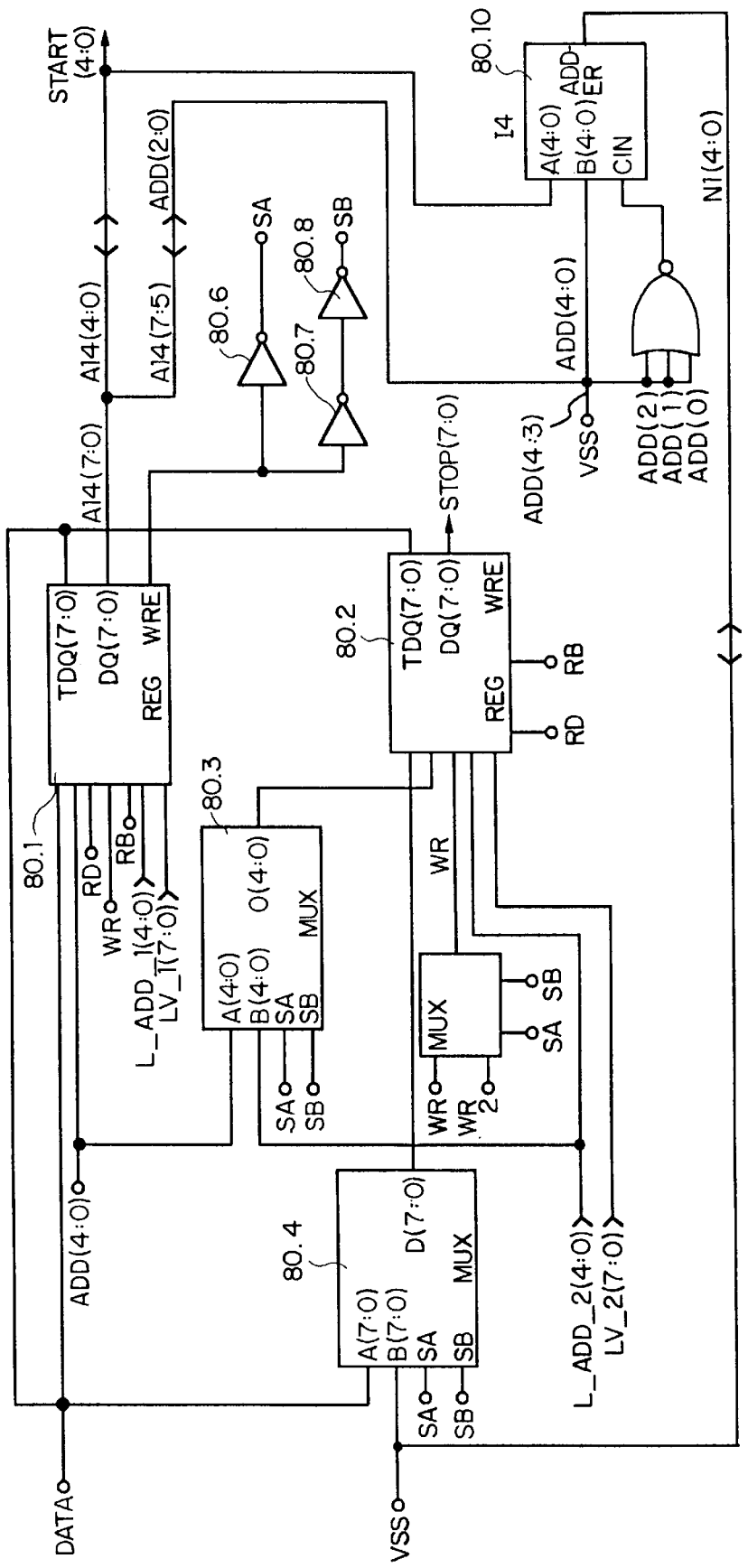
FIG. 5 is a detailed circuit diagram of a control circuit shown in FIG. 4.
Figure 6:
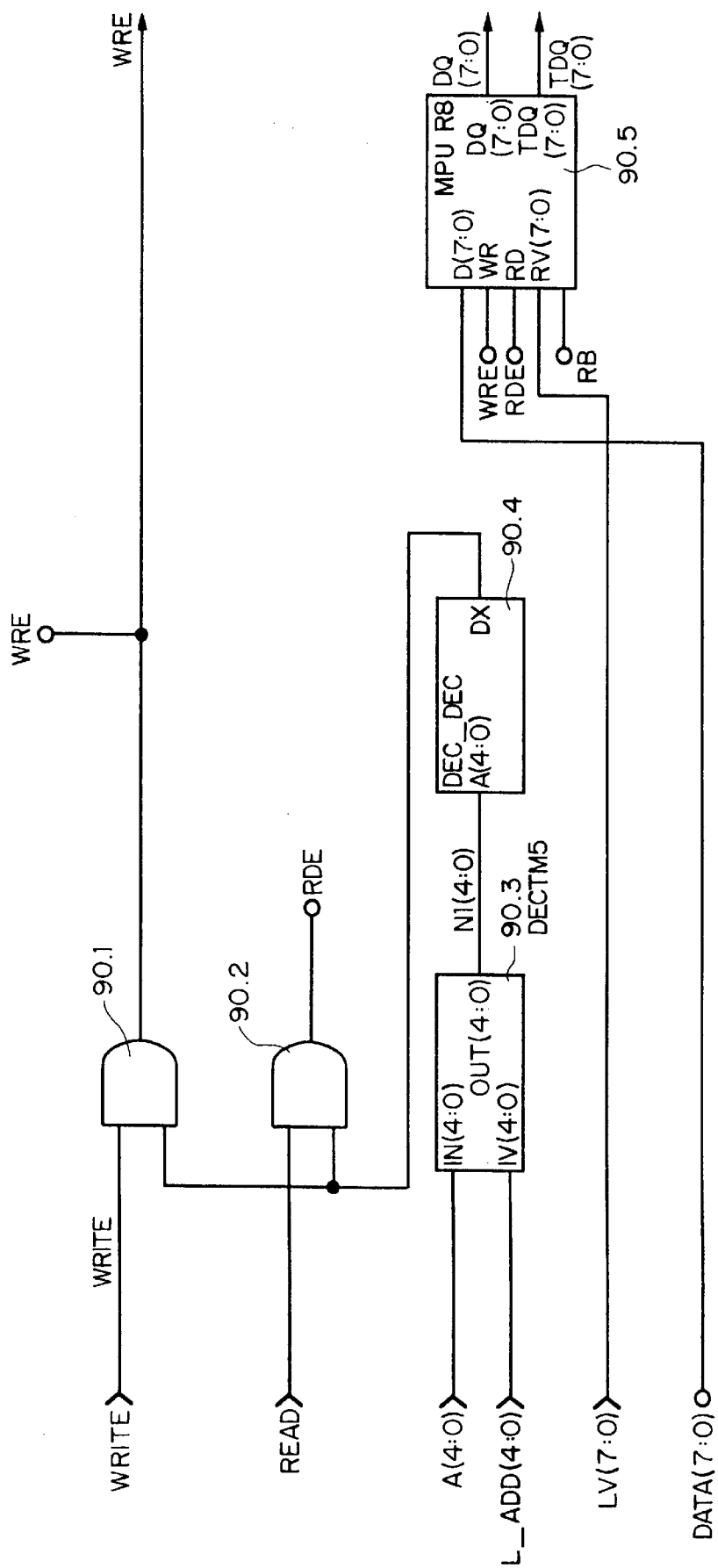
FIG. 6 is a detailed circuit diagram of components shown in FIG. 5.

An illustrative embodiment of the detailed configuration of the control circuit 80 is shown in FIG. 5. In particular, the circuit 80 comprises registers 80.1 and 80.2, multiplexers 80.3 to 80.5, inverters 80.6 to 80.8, a gate circuit 80.9, and an adder 80.10. Furthermore, a detailed example of the configuration of the register 80.1 (or 80.2) is shown in FIG. 6. In particular, the register 80.1 (or 80.2) comprises gate circuits 90.1 and 90.2 and various components 90.3 to 90.5.

Referring back to FIG. 5, the time code start information START can be controlled by inputting appropriate values to the register 80.1. For example, if the information START is to be set to a particular count value, the user can command the microcomputer (not shown) to output such value to the register 80.1 via the data bus DATA, output the address of the register 80.1 (e.g. "20" ("10100")) via the address bus ADD, and output the write enable signal WR. As a result, the register 80.1 outputs the particular count value via its output port DQ as an output signal A14.

The five least significant bits of the signal A14 (e.g. bits 4 to 0) are output as the five least significant bits of the information START (e.g. bits 4 to 0). The three most significant bits of the signal A14 (e.g. bits 7 to 5) are outputs as the three least significant bits of an adder input signal ADD (e.g. bits 2 to 0).

The three least significant bits of the signal ADD are combined with the two most significant bits of the signal ADD (e.g. bits 4 and 3) derived from another source (e.g. a hardwired two bit signal). Then, the five bit adder input signal ADD is input to a first port of the adder 80.10, and the five least significant bits of the information START (e.g. bits 4 to 0) are input to a second port of the adder 80.10. Furthermore, the three least significant bits of the signal ADD (e.g. bits 2 to 0) are input to a input CIN of the adder via the gate circuit 80.9. Subsequently, the adder 80.10 adds the input signal ADD and the five bits of the information START and outputs a resultant added output signal N1.

As in the case above, when the microcomputer (not shown) outputs the new count value on the data bus DATA, an address which equals the preset address signal L_ADD_1 (i.e. "20" ("10100")) on the address bus ADD, and the write enable signal WR, the register 80.1 outputs a second write enable signal WRE having a particular value (e.g. "1") from its write enable output port WRE. In particular, as shown in FIG. 6, the circuit 90.3 inputs the address on the bus ADD and the preset address signal via the port L_ADD_1. If such signals are equal, the circuit 90.3 outputs a coincidence signal having a value which equals "1".

The gate circuit 90.1 inputs the coincidence signal via the s circuit 90.4, inputs the write enable signal WR from the microcomputer (not shown), and performs an AND operation on such signals. Since the coincidence signal equals "1", the gate circuit 90.1 outputs the write enable signal WR as the second write enable signal WRE. The second write enable signal WRE is inverted by the inverter 80.6 to produce a first selection signal SA having a certain value (e.g. "0"), and the second write enable signal WRE is inverted twice by the inverters 80.7 and 80.8 to produce a second selection signal SB having a particular value (e.g. "1")

The multiplexer 80.4 inputs the data on the data bus DATA via its first input port, the adder output signal N1 via its second input port, and the selection signals SA and SB via its selection input ports. Since the selection signal SA equals "0" and the selection signal SB equals "1", the multiplexer 80.4 outputs the adder output signal N1 as a first selected signal.

The multiplexer 80.3 inputs the address contained on the address bus ADD via its first input port and inputs the preset address signal "21" ("10101") input to the port L_ADD_2 via its second input port. Furthermore, the multiplexer 80.3 inputs the selection signals SA and SB via its selection input ports. Since the selection signals SA and SB equal "0" and "1", respectively, the multiplexer 80.3 outputs the preset address signal "21" ("10101") as a second selected signal.

The register 80.2 inputs the first selected signal (i.e. the adder output signal N1) from the multiplexer 80.4 via its data input port. Also, the register 80.2 inputs the second selected signal (i.e. the preset address signal "21" ("10101")) from the multiplexer 80.3 via its address input port.

Accordingly, the address input to the address port of the register 80.2 equals the preset address signal "21" ("10101"), and thus, the register 80.2 automatically outputs the adder output signal N1 as the seven least significant bits of the time code stop information STOP (e.g. bits 7 to 0). As described above, if the time code start information START is set in the register 80.1 by inputting particular data from the data bus DATA, the time code stop information STOP is automatically set in the register 80.2 without having to output additional data is from the microcomputer (not shown).

However, if the user is not satisfied with the information STOP which was automatically set in the register 80.2 by the above operation, the user may instruct the microcomputer (not shown) to output different information STOP on the data bus DATA and to output the address on the address bus ADD which equals the preset address signal (i.e. "21" ("10101")). As a result, the different information STOP is set in the register 80.2.

Specifically, after start and stop information START and STOP have been respectively set in the registers 80.1 and 80.2, the microcomputer (not shown) is no longer outputting an address which equals the address (e.g. "20" ("10100")) to the port L_ADD_1 or the write enable signal WR. Accordingly, the second write enable signal WRE output from the register 80.1 equals "0", and thus, the selection signals SA and SB equal "1" and "0", respectively. As a result, the multiplexer 80.4 outputs any data on the data bus DATA to the data input port of the register 80.2, and the multiplexer 80.3 outputs any address on the address bus ADD to the address input port of the register 80.2. Therefore, the user merely needs to instruct the microcomputer to output the correct data and address on the buses DATA and ADD in order to change the value of the information STOP output from the register 80.2.

As described above in conjunction with FIG. 4, the count value input to the port LVP of the control circuit 70 equals "0" ("00000000"). Accordingly, the two most significant bits the information STOP (e.g. bits 9 and 8) equal 110011, and the five most significant bits of the information START (e.g. bits 9 to 5) equal "00000". Furthermore, the count values input to the ports LVP1 and LVP2 of the control circuit 80 respectively equal "11" ("00001011") and "12" ("00001100"). Consequently, the eight least significant bits of the information STOP (e.g. bits 7 to 0) equals "00001100", and the five least significant bits of the information START (e.g. bits 4 to 0) equal "01011". Accordingly, if the user does not change the count values stored in the circuits 70 and 80 or if the reset bar signal RB has been output, the time code stop and start information STOP and START equal "0000001100" and "0000001011", respectively.

As described above, a user can quickly and easily change the time code start information START and the time code stop information STOP. Accordingly, the locations within a composite video signal at which the time code information is detected by the time code generator can be changed. Thus, the generator of the present invention can be programmed to detect the time code information in different signals transmitted by different broadcasting systems.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A time code generator comprising:

detecting means for detecting serial time code information by comparing a composite video information having a digital conversion level with a selected reference level;

serial-to-parallel conversion means for converting said serial time code information into parallel time code information;

selector means for selectively outputting said composite video information or said parallel time code information as selected information;

latching means for latching said selected information as latched information in accordance with a predetermined transmission rate and outputting said latched information as an output signal, wherein said latching means latches said selected information in response to a time code clock signal;

line window signal generating means for generating a line window signal by comparing a line count value of said composite video information with preset time code start information and preset time code stop information;

clock generating means for generating said time code clock signal in response to said line window signal; and interfacing means for inputting external data and for generating at least one control signal for controlling at least one of said detecting means, said serial-to-parallel conversion means, said selector means, said latching means, said line window signal generating means, and said clock generating means in accordance with said external data.

2. A time code generator as claimed in claim 1, wherein said clock generating means comprises:

reset means for inputting said serial time code information and said line window signal and for outputting a corresponding reset signal; and clock means for inputting said reset signal and generating said time code clock signal.

3. A time code generator as claimed in claim 2, wherein said reset means comprises:

a falling edge detector which inputs said serial time code information, detects a falling edge of a time code sync bit signal contained in said serial time code information, and outputs a corresponding falling edge detection signal;

a gate circuit which inputs said line window signal and said falling edge detection signal, performs a logic operation on said line window signal and said falling edge detection signal, and outputs a corresponding generator setting signal;

active signal generating means for generating an active signal, wherein said active signal generating means is set by said generator setting signal and is reset by a horizontal sync signal of an active video signal;

a rising edge detector which detecting a rising edge of said active signal and generates said reset signal based on said rising edge.

4. A time code generator as claimed in claim 2, wherein said clock means comprises:

a first clock generator for inputting a determining constant and said reset signal, for resetting in response to said reset signal and for generating a first clock signal based on said determining constant, wherein said first clock signal corresponds to a particular data transmission rate which is based on a clock number determined per line in response to said determining constant and wherein said determining constant is output by said interfacing means;

a second clock generator for inputting said first clock signal and generating a second clock signal, wherein said second clock signal equals a result of frequency-dividing said first clock signal in accordance with a predetermined division ratio and wherein said predetermined division ratio is based on a ratio selection signal generated by said interfacing means; and a clock selector for selectively outputting said first clock signal or said second clock signal as said time code clock signal in accordance with an output selection signal generated by said interfacing means.

5. A time code generator as claimed in claim 3, wherein said clock means comprises:

a first clock generator for inputting a determining constant and said reset signal and for generating a first clock signal based on said determining constant and said reset signal, wherein said first clock signal corresponds to a particular data transmission rate which is based on a clock number reset in response to said reset signal and determined per line in response to said determining constant and wherein said determining constant is output by said interfacing means;

a second clock generator for inputting said first clock signal and generating a second clock signal, wherein said second clock signal equals a result of frequency-dividing said first clock signal in accordance with a predetermined division ratio and wherein said predetermined division ratio is based on a ratio selection signal generated by said interfacing means; and a clock selector for selectively outputting said first clock signal or said second clock signal as said time code clock signal in accordance with an output selection signal generated by said interfacing means.

6. A time code generator as claimed in claim 4, wherein said predetermined division ratio corresponds one of to 1/8 and 1/10 of said data transmission rate.

7. A time code generator as claimed in claim 5, wherein said predetermined division ratio corresponds to one of 1/8 and 1/10 of said data transmission rate.

8. A time code generator as claimed in claim 1, wherein said selected reference level is an analog-digital conversion level of said composite video information.

9. A time code generator as claimed in claim 8, wherein said detecting means selects said reference level to be one of a plurality of reference values.

10. A time code generator as claimed in claim 9, wherein said plurality of reference values comprise a first reference value which equals 96 and a second reference value which equals 128.

11. A time code generator as claimed in claim 9, wherein said detecting means selects said one of said plurality of reference values in accordance with a reference value setting signal generated by said interfacing means.

12. A time code generator as claimed in claim 1, wherein said time code start information has a first initial value and said time code stop information has a second initial value, and wherein said interfacing means can change at least one of said first initial value and said second initial value based on at least one written adjustment value input during a writing operation performed by said interfacing means.

13. A time code generator as claimed in claim 12, wherein said at least one written adjustment value corresponds to said external data input to said interfacing means by a user.

14. A time code generator as claimed in claim 12, wherein said at least one written adjustment is reset during a resetting operation performed by said interfacing means such that said time code start information has said first initial value and said time code stop information has said second initial value.

15. A time code generator as claimed in claim 12, wherein said at least one written adjustment value comprises a first adjustment value to which said first initial value is changed and comprises a second adjustment value to which said second initial value is changed.

16. A time code generator as claimed in claim 15, wherein said interfacing means has a mode in which said second initial value is automatically changed when said first initial value is changed.

17. A time code generator comprising:

a detector which detects serial time code information by comparing a composite video information having a digital conversion level with a selected reference level;

a serial-to-parallel converter which converts said serial time code information into parallel time code information;

a selector which selectively outputting said composite video information or said parallel time code information as selected information;

a latch which latches said selected information as latched information in accordance with a predetermined transmission rate and which outputs said latched information as an output signal, wherein said latch latches said selected information in response to a time code clock signal;

a line window signal generator which generates a line window signal by comparing a line count value of said composite video information with time code start information and time code stop information;

resetting means for inputting said serial time code information, for generating a falling edge detection signal based on a falling edge of said serial time code information, for inputting said line window signal, for setting a reset signal in response to said falling edge detection signal and said line window signal, and for resetting said reset signal at a rising edge of a horizontal sync signal contained in an active video signal;

a clock generator for generating a first clock signal, wherein said first clock signal corresponds to a particular data transmission rate which is based on a clock number reset in response to said reset signal and is determined per line in response to a determining constant, for generating a second clock signal obtained by frequency-dividing said data transmission rate in accordance with a certain division ratio, and for selectively outputting said first clock signal or said second clock signal as said time code clock signal; and interfacing means for inputting external data and for generating at least one control signal for controlling at least one of said detector, said serial-to-parallel converter, said selector, said latch, said line window signal generator, and said clock generating means in accordance with said external data.

* * * * *